United States Patent [19]
duPont

[11] Patent Number: 5,226,455
[45] Date of Patent: Jul. 13, 1993

[54] VARIABLE GEOMETRY DUCT SEAL

[76] Inventor: Anthony A. duPont, 7946 Ivanhoe Ave., La Jolla, Calif. 92037

[21] Appl. No.: 704,390

[22] Filed: May 23, 1991

Related U.S. Application Data

[63] Continuation-in-part of Ser. No. 628,091, Dec. 17, 1990, abandoned.

[51] Int. Cl.$^5$ .......................... F15D 1/02; B64D 33/02
[52] U.S. Cl. ........................................ 138/45; 138/26; 138/40; 138/46; 137/15.1; 244/53 B
[58] Field of Search .................... 138/26, 30, 31, 40, 138/45, 46; 137/15.1, 15.2; 244/53 B

[56] References Cited

U.S. PATENT DOCUMENTS

| | | | |
|---|---|---|---|
| 1,169,250 | 1/1916 | Fulton | 138/30 |
| 2,365,994 | 12/1944 | Ashton | 138/31 |
| 2,411,315 | 11/1946 | Ashton | 138/30 |
| 2,415,812 | 2/1947 | Cunningham | 138/31 |
| 2,688,984 | 9/1954 | Snyder | 138/31 |
| 2,953,151 | 9/1960 | Snyder | 138/31 |
| 3,450,142 | 6/1969 | Barry | 137/15.2 |
| 3,853,147 | 12/1974 | Cibulka | 138/30 |
| 3,862,646 | 1/1975 | Tarsha | 138/31 |
| 3,874,417 | 4/1975 | Clay | 138/30 |
| 4,966,200 | 10/1990 | Bents | 138/31 |

FOREIGN PATENT DOCUMENTS

| | | | |
|---|---|---|---|
| 1181006 | 11/1964 | Fed. Rep. of Germany | 137/15.1 |
| 0050015 | 4/1977 | Japan | 138/31 |

*Primary Examiner*—James E. Bryant, III

[57] ABSTRACT

A variable-geometry duct having at least one moveable side wall, and a bellows interposed between the side wall and a back-up structure. The bellows creates a sealed cavity between the moveable side wall of the duct and the back-up structure. Pressurized fluid in the cavity is controlled so as to maintain a desired pressure differential between it and the pressure of the fluid carried by the conduit for all positions of the moveable side wall.

5 Claims, 2 Drawing Sheets

VARIABLE GEOMETRY DUCT SEAL

This application is a continuation-in-part of co-pending application Ser. No. 628,091 filed Dec. 17, 1990, now abandoned.

BACKGROUND OF THE INVENTION

Variable geometry ducts are widely used, for example, in conjunction with turbo engine inlets and nozzles; and in conjunction with variable geometry wind tunnel walls and inlets; and also as inlet ducts, combustor and nozzle walls in variable geometry ram jet engines. Examples of such variable geometry ducts are disclosed, for example, in U.S. Pat. Nos. 3,265,332; 3,589,379 and 4,620,679. Variable geometry ducts in the prior art, as shown in the patents listed above, are usually formed by a series of side-wall panels which are controlled by appropriate actuators to move in and out as a function of the amount of gas carried by the duct in response to the demands of the engine, or other instrumentality fed by the ducts.

It is also the practice in the prior art to pressurize the cavity behind the moveable duct panels to equalize the pressure in the cavity with the fluid pressure in the duct. This equalization of pressures on both sides of the moveable panels minimizes the actuation forces required to move the panels, and also minimizes leakage of combustible gas from the duct into the cavities behind the moveable panels.

Problems have arisen in the past in sealing such variable geometry ducts, and an objective of the present invention is to provide a solution to the problems.

SUMMARY OF THE INVENTION

In the embodiment to be described, sealing problems in moveable wall variable geometry ducts, such as discussed above, are solved by mounting the moveable wall panels of the duct on individual bellows. These bellows permit the wall panels to move in and out within reasonable limits, and at the same time, serve to seal the cavity behind each panel. Specifically, the cavity behind each individual panel of the duct is completely enclosed by within the interior of the bellows, by the corresponding panel and the back-up structure behind the panel.

A pressurized system introduces pressurized air or gaseous nitrogen, for example, into the sealed cavities, and a bleed system operates in conjunction with the pressurization system to maintain the cavities at a desired pressure level with respect to the pressure of the fluid carried by the duct.

Static pressure taps may be mounted on the surface of the individual panels to provide data concerning the pressure of the fluid carried by the duct. This data is used to activate the actuators which cause the panels to move in or out with respect to the interior of the duct. The pressurization system is also activated to increase or decrease the amount of gas in each of the cavities behind the moveable panels, so as to maintain the desired pressure differential between the gas in the cavities and the fluid carried by the duct.

In non-flight applications the cavities may be filled with a non-compressible medium, such as water or hydraulic fluid.

DETAILED DESCRIPTION OF THE ILLUSTRATED EMBODIMENTS

Figure 1A:
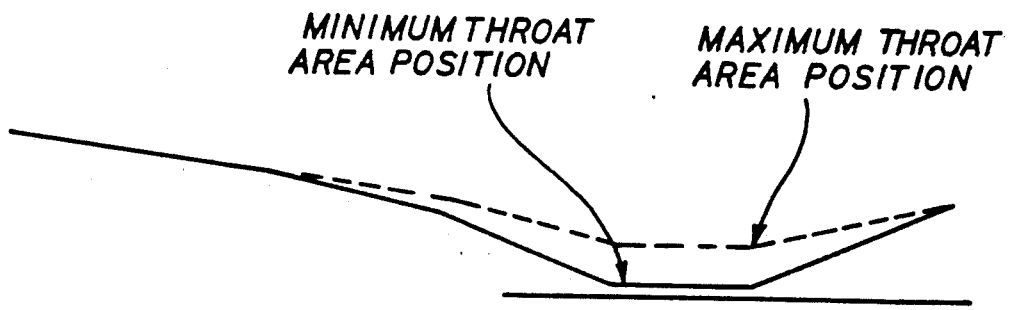
FIGS. 1A and 1B are respectively side and front views showing schematically the desired inlet geometry variation in a typical duct of the type under consideration.
Figure 1B:
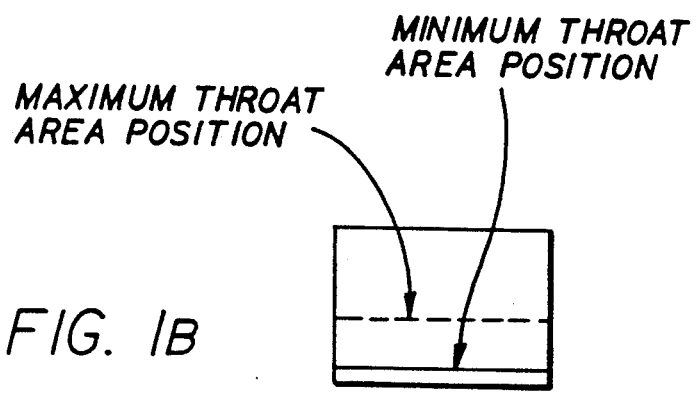
Figure 3:
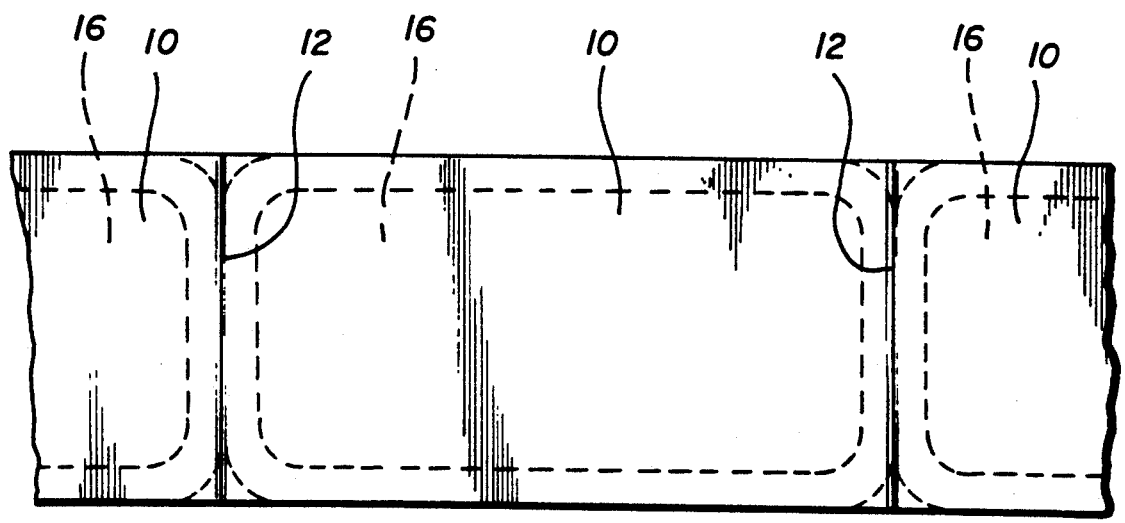
FIG. 3 is a top plan view of the duct assembly.

As stated above, FIG. 1A is a side view and FIG. 1B is a front view showing the desired inlet geometry variations in a typical duct, and which is achieved by the assembly of the present invention.

Figure 2:
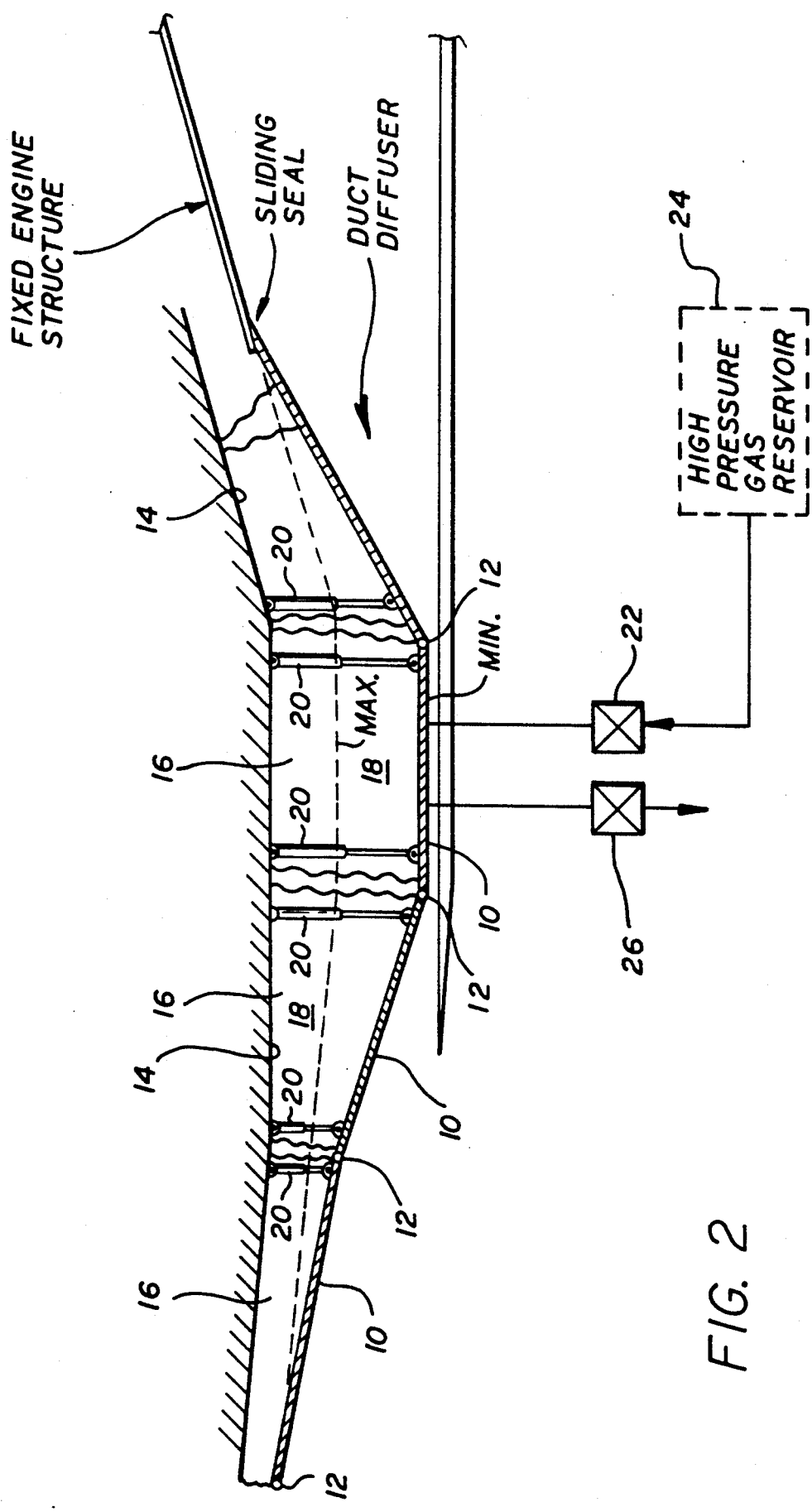
FIG. 2 is a side sectional view showing a variable geometry duct assembly which incorporates the concepts of the present invention.

FIG. 2, as also stated above, shows a side section of a typical variable geometry duct which is sealed in accordance with the concepts of the present invention. The lower wall of the duct shown in FIG. 2 includes a series of moveable panels 10 which are coupled to one another by appropriate pivotal coupling pins which forms hinged joints between the individual panels. The panels 10 are preferably rectangular, and in accordance with the invention, each of the movable panels is mounted on a rectangular-shaped bellows 16. Each bellows extends around the perimeter of the corresponding panel, and circumscribes and seals the space to the rear of the panel. In the illustrated embodiment, each bellows 16 is attached at one end to the corresponding panel 10, and the other end of each bellows is attached to a back-up structure 14. In this way, a cavity 18 is provided between each moveable panel 10 and the back-up structure 14.

Appropriate actuators 20 are provided in each cavity 18, and these actuators respond to appropriate sensors, as described above, to cause the panels 10 to move with respect to the back-up structure 14 to control the geometry of the duct, for example, in accordance with the volume of combustible fluid carried by the duct.

Each cavity 18 is filled by high pressure gas which is introduced to the cavity through an inlet valve 22, the inlet valve being controlled by the sensors referred to above. The high pressure gas, or other fluid, may be derived from a pressurized reservoir 24.

In order to maintain a desired pressure differential between the gas in cavity 18 and the combustible fluid in the duct, an outlet valve 26 is provided, which also is actuated by appropriate sensors to bleed gas from the cavity 18. In this manner, the gas in cavity 18, may be maintained at a desired pressure differential with respect to the pressure of the combustible fluid in the duct.

The invention provides, therefor, a simple and inexpensive means by which the cavities behind the moveable panels of a variable geometry duct may be completely sealed, and so that the efficiency of the overall system may be substantially enhanced.

It will be appreciated that while a particular embodiment of the invention has been shown and described, modifications may be made. It is intended in the claims to cover all modifications that come within the true spirit and scope of the invention.

I claim:

1. A variable geometry fluid carrying duct assembly comprising: a back-up structure; a plurality of movable side panels spaced from said back-up structure and hinged to one another to form one side wall of a fluid-carrying duct having an inlet and an outlet, with fluid received through the inlet flowing across said panels from said inlet to said outlet; and a corresponding plurality of bellows supporting the panels for reciprocal movement to control the cross sectional geometry of said duct and circumscribing the perimeter of each of the panels, said bellows being interposed between respective ones of said movable panels and the back-up structure to enclose respective cavities between the panels and the back-up structure to provide seals for the respective cavities.

2. The variable geometry assembly defined in claim 1, and which includes a pressurization system for introducing a pressurized fluid into said cavities; and a further system for bleeding the pressurized system from said cavities so as to establish a selected relationship between the pressure of fluid carried by the duct and the pressure of fluid in the cavities.

3. The variable geometry assembly defined in claim 1, in which each of said bellows is attached at one end to a corresponding one of said panels and the other end to the back-up structure.

4. The variable geometry assembly defined in claim 1, and which includes actuating means mounted in each of said cavities for moving said panels back and forth with respect to the back-up structure.

5. The variable geometry assembly defined in claim 1, in which said panels each has a rectangular shape, and in which said bellows each has a rectangular cross section.

* * * * *